United States Patent [19]
Veretto

[11] 3,762,137
[45] Oct. 2, 1973

[54] STALK SHREDDER

[76] Inventor: Donald E. Veretto, 709 80th St., Lubbock, Tex. 79404

[22] Filed: Oct. 2, 1972

[21] Appl. No.: 294,367

[52] U.S. Cl..................... 56/13.3, 56/10.3, 56/13.5
[51] Int. Cl............................................. A01d 87/10
[58] Field of Search.................. 56/10.3, 12.7, 13.1, 56/13.3, 104, 295, 30, 33, 34, 35

[56] References Cited
UNITED STATES PATENTS

| | | | |
|---|---|---|---|
| 3,600,877 | 8/1971 | McCrary | 56/10.3 |
| 2,998,689 | 9/1961 | Boesch, Jr. | 56/12.7 |
| 3,372,536 | 3/1968 | McCunn | 56/13.1 |
| 2,484,802 | 10/1949 | Aasland | 56/104 |

Primary Examiner—Russell R. Kinsey
Attorney—Charles W. Coffee

[57] ABSTRACT

A shredder head is attached to the vehicle carrying the cotton stripper. Thus, cotton stalks are shredded within five seconds after cotton is stripped therefrom. This aids proper land management of prompt incorporation of the shredded material into the soil and reduces pests, including the cotton boll weevil.

The shredding is accomplished by a pair of blades pivoted to a horizontal plate mounted on a vertical, rotating shaft within the head and aligned with each row of cotton.

2 Claims, 4 Drawing Figures

STALK SHREDDER

BACKGROUND OF THE INVENTION:

1. Field of the Invention

This invention relates to cotton stripping and shredding the stalks from which the cotton has been stripped.

2. Description of the Prior Art

At the present time, much of the cotton grown in the United States is mechanically stripped from the stalks. These cotton strippers are well known and commercially available.

In agricultural practice, cotton is stripped from its stalks, leaving a bare stalk; the stalk is shredded later and field plowed in preparation for another crop.

In certain sections of the country, governmental regulations require that the cotton stalks be shredded promptly after stripping, and in certain areas, this must be done by a certain date in order to combat pests which make their habitant in the stalks, such as the cotton boll weevil.

Customarily, the operation is performed in at least three steps: (1) one vehicle goes over the field, stripping the cotton from the stalks, (2) a second vehicle moves through the field shredding the stalks, and (3) a third vehicle having plows, etc., plows under the shredded stalks. Normally, the cotton is stripped from the stalk with two-row strippers (two rows at a time), but often the shredders cover several rows at a time, and the plows may cover one or more rows. Although cotton is customarily planted in rows with a drill only three or four inches wide and spaced 36 to 40 inches to the next row, most stalk shredders are made at least 100 inches wide and consequently require considerable power to operate. Most of the power is used to overcome wind resistance of the blades.

SUMMARY OF THE INVENTION

I have found that small shredder heads can efficiently shred cotton stalks if they are mounted on the tractor immediately aligned with the rows of cotton. At the time the cotton is stripped from the stalks, the vehicle and assorted equipment is accurately aligned with the rows being stripped. This accurate alignment permits small shredders to be used. Inasmuch as the vehicle is accurately aligned with the rows of cotton stalks, these smaller heads shred the stalks more efficiently without the use of excess power. I have found it desirable to mount two shredders at the rear of the vehicle carrying the two-row cotton stripper to shred the stalks immediately after the cotton has been stripped therefrom.

An object of this invention is to shred cotton stalks.

Other objects are to achieve the above with a device that is sturdy, compact, durable, lightweight, simple, safe, efficient, and reliable, yet inexpensive and easy to manufacture, install, operate and maintain.

Further objects are to achieve the above with a method that is rapid, efficient, and inexpensive, and does not require skilled people to install, adjust, operate and maintain.

The specific nature of the invention, as well as other objects, uses, and advantages thereof, will clearly appear from the following description and from the accompanying drawing, the different views of which are not necessarily to the same scale.

Figure 1:
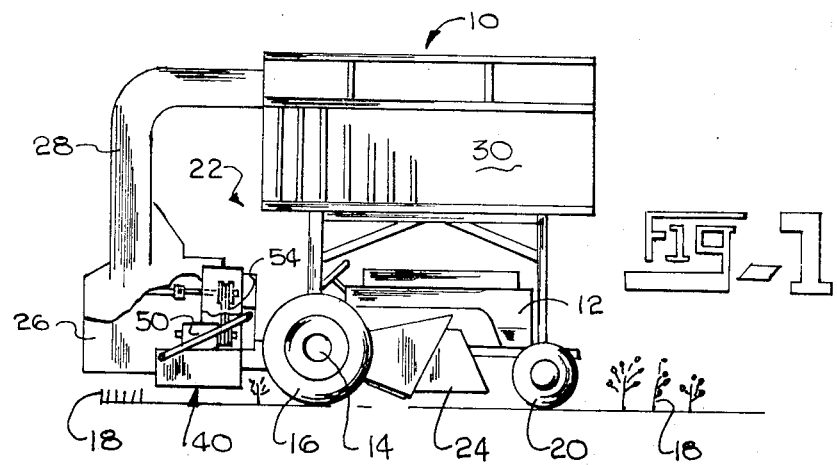
FIG. 1 is a side elevational view of a tractor with stripper and shredder mounted thereon according to my invention, with parts broken away for clarity of illustration.
Figure 2:
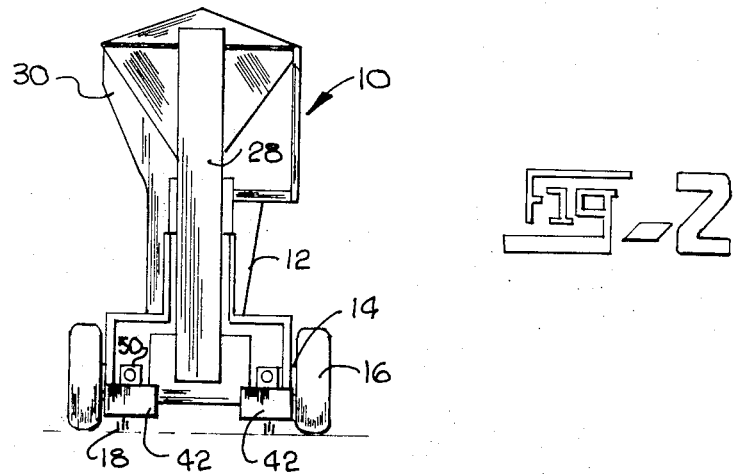
FIG. 2 is a rear elevational view of the mechanism shown in FIG. 1.
Figure 3:
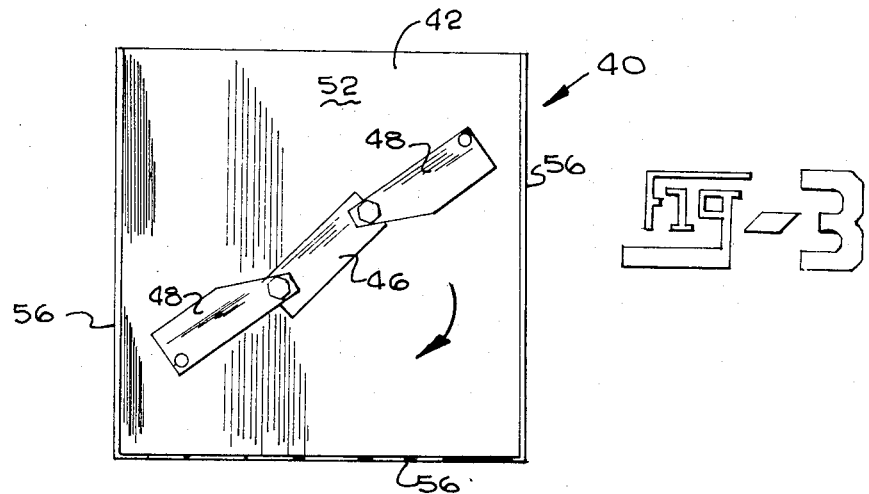
FIG. 3 is an enlarged bottom plan view of one of the shredder heads.
Figure 4:
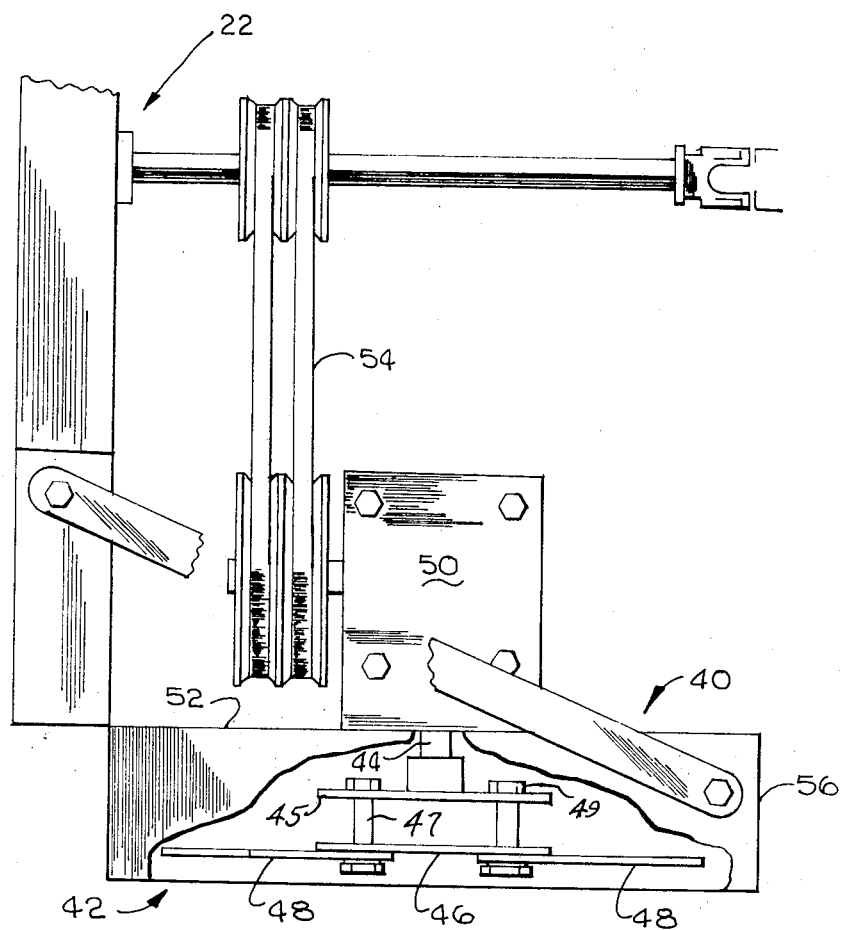
FIG. 4 is a further enlarged side elevational view of one of the heads partially broken away.

DESCRIPTION OF THE PREFERRED EMBODIMENT:

Referring to the drawing, there may be seen typical cotton harvester 10 with my improved shredder 40 mounted thereon.

The harvester 10 includes vehicle 12. Customarily, the vehicle is either an ordinary agricultural tractor or something quite similar to it. The vehicle 12 will have rear axle 14 with two rear wheels 16 mounted thereon. The two rear wheels 16 are spaced wider apart than the rows of cotton 18 so they will straddle two rows. The vehicle 12 has at least one front wheel 20. For the purposes of this invention, it is immaterial whether the vehicle be a tricycle-type vehicle with only one front wheel or a quadricycle-type with two front wheels.

Cotton stripper 22 is mounted upon the vehicle 12. The cotton stripper includes two stripper elements 24. There is a stripper element for each row of cotton 18, and the stripper elements 24 are sligned with the rows of cotton. Ordinarily the cotton is planted in a drill being no more than three or four inches wide and the rows spaced 36 to 40 inches apart. For ordinary stripper elements 24, it is necessary that the stripper element be accurately aligned with the drill within an inch or two. Therefore, there will be one element 24 for each row of cotton 18 and each element will be aligned with the row of cotton.

The stripper elements 24 as illustrated are mounted between the front and rear wheels 20 and 16. The rear wheels 16 of the vehicle 12 are spaced apart wider than the stripper elements 24 since the rear wheels 16 straddle two rows 18 and the stripper elements 24 are aligned with two rows. The stripper elements 24 form means for stripping the cotton from the stalk. From each stripper element 24, the cotton is moved by conventional means and partially cleaned by cleaners 26 to elevator-conveyor or conveyor means 28. This conveyor means is means for conveying the stripped cotton to basket 30. The conveyor 28 is located and extends from the cleaner 26 behind the rear axle to the basket 30 which is above the stripper elements 24 and, therefore, above the entire vehicle 12. The cotton is conveyed from the stripper element 24 to the conveyor, it may be said that the conveyor 28 conveys it from the stripper elements 24 to the basket 30.

In normal operation, the vehicle will move less than 5 miles per hour (7.3 ft per second) and more often will move about 4 miles per hour (5.9 ft per second). Also, the total length of the vehicle from the axle of the front wheels 20 to the rear axle 14 will be less than 20 feet.

The basket 30 includes means for dumping the cotton into another container such as a trailer to be conveyed to a gin or a ricker.

What has been described above is known to the art, is conventional and commercially available on the market.

I have added shredder 40 which includes two heads 42. These heads 42 are attached by conventional brackets to the rear axle 14 so the heads themselves are located at a level lower than the rear axle and rearward of the rear axle. The heads will be located within 20 feet or less of the stripper elements 24. Therefore, even if the cotton harvester 10 is moving quite slowly, e.g., three Miles per hour (4.4 ft per second), the time between the time the stalk has the cotton stripped therefrom until the harvester travels 20 feet will only be 4.5 seconds. Therefore, with the shredder 40 so attached, the stalks are shredded within five seconds after the cotton has been stripped therefrom.

Moreover, the stripper heads 42 will be accurately aligned with the row of stalks and, therefore, it is not necessary to have a large shredder, but all that is necessary is to have a shredder large enough to accommodate the stalks and the stalks will always be fed accurately into the shredder. Shredder heads of small diameter will consume much less power.

I prefer to use a shredder having vertical shaft 44. Top plate 45 is attached to the shaft 44. Main plate 46 is spaced from the top plate 45 by two pipe nipples or tubes 47 and the plates clamped together by two bolts 49 extending through the tubes 47 and through holes in the plates 45 and 46 as illustrated. The elevation of blades 48 may be adjusted by the length of tubes 47 and bolts 49. At least two cutter blades 48 are pivoted to the plate 46. The shaft 44 is mounted into right-angle gear box 50 mounted upon top cover 52 of the shredder head 42. Additional gearing means, such as belts 54, connect the gear box 50 to a rotating shaft mounted upon the vehicle 12. Therefore, power is provided to rotate the shaft 44 so the blades 48 shred the stalks in a manner well known.

The cover for the heads include not only the top 52, but sides 56. The sides are not only protecting the operator from accidental contact with the blades 48, but, also, the sides 56 tend to confine the material as it is being shredded so it bounces off the sides back onto the blades so the material is shredded finely.

The brackets by which the heads 42 are connected to the tractor are within the skills of ordinary mechanics and those engaged in the farm machinery arts as are the details of the gearing means, the speed of rotation, etc. It will be noted, however, that the shredder heads 42 and the covers thereof form a convenient step for the operator to climb on the cotton harvester 10 which is otherwise a difficult procedure.

Thus it may be seen that I have provided method and means to meet by objectives stated above.

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:
1. On a cotton harvester including
   a. a vehicle adapted to move along rows of cotton,
   b. the vehicle having
      i. a rear axle carrying
      ii. two rear wheels
      iii. said two wheels spaced apart wider than the rows of cotton, therefore, adapted to straddle two rows of cotton, and
      iv. at least one front wheel,
   c. a cotton stripper mounted upon said vehicle,
   d. said cotton stripper including
      i. two stripper elements,
      ii. one element for each row of cotton and aligned therewith,
      iii. said elements mounted on the vehicle between the front and rear wheels, and
      iv. said rear wheels of the vehicle spaced apart wider than said elements,
   e. a basket mounted upon the vehicle,
   f. said basket mounted above the stripper elements, and
   g. a conveyor means for conveying stripped cotton from the stripper elements to the basket,
   h. said conveyor means mounted on the vehicle behind the rear axle,
   j. THE IMPROVEMENT COMPRISING IN COMBINATION WITH THE ABOVE:
   k. a shredder having two shredder heads,
   m. one shredder head aligned with each stripper element and thus each row of cotton,
   n. each shredder head having a cover,
      i. attached to the vehicle
      ii. at a level lower than the rear axle, and
      iii. rearward of the rear axle,
   o. each shredder head also having a rotatable vertical depending shaft journaled to the cover,
   p. a plate on the shaft,
   q. at least two cutter blades pivoted to the plate, and
   r. gear means extending from each of the shafts to the vehicle for rotating each of said shafts.
2. The invention as defined in claim 1 with additional limitations of
   s. a top plate directly attached to said shaft,
   t. bolts extending from said top plate through said first named plate,
   u. tubes surrounding said bolts and spaced between said plates, whereby
   v. the space between the plates is adjustable and, therefore, the height of said first named plate may be adjusted by the length of said tubes.

* * * * *